US008130769B2

(12) United States Patent
West et al.

(10) Patent No.: US 8,130,769 B2
(45) Date of Patent: Mar. 6, 2012

(54) CONFIGURING A NETWORK DEVICE (75) Inventors: Julian Wray West, North Hampton, NH (US); Eric J. Martin, Chester, NH (US); Rajesh K. Mishra, Westford, MA (US)

(73) Assignee: Whaleback Systems Corporation, Portsmouth, NH (US)

( * ) Notice: Subject to any disclaimer, the term of this patent is extended or adjusted under 35 U.S.C. 154(b) by 369 days.

(21) Appl. No.: 11/580,540

(22) Filed: Oct. 13, 2006

(65) Prior Publication Data

US 2007/0133567 A1   Jun. 14, 2007

Related U.S. Application Data (60) Provisional application No. 60/727,130, filed on Oct. 14, 2005.

(51) Int. Cl.
*H04L 12/56* (2006.01)
(52) U.S. Cl. ............ 370/401; 370/431; 455/435.1; 709/203; 709/220; 709/227; 717/171; 717/176
(58) Field of Classification Search ................. None
See application file for complete search history.

(56) References Cited

U.S. PATENT DOCUMENTS

| | | | |
|---|---|---|---|
| 4,354,062 A | 10/1982 | Mussman et al. | |
| 4,656,366 A | 4/1987 | Davis et al. | |
| 4,763,317 A | 8/1988 | Lehman et al. | |
| 5,796,795 A | 8/1998 | Mussman et al. | |
| 6,104,711 A | 8/2000 | Voit | |
| 6,188,687 B1 | 2/2001 | Mussman et al. | |
| 6,243,388 B1 | 6/2001 | Mussman et al. | |
| 6,282,574 B1 | 8/2001 | Voit | |
| 6,775,697 B1 | 8/2004 | Surazski et al. | |
| 6,958,992 B2 * | 10/2005 | Lee et al. ............. | 370/352 |
| 7,046,659 B1 * | 5/2006 | Woundy ............... | 370/352 |
| 7,075,922 B2 | 7/2006 | Mussman et al. | |
| 7,127,526 B1 * | 10/2006 | Duncan et al. ............. | 709/249 |
| 7,151,966 B1 | 12/2006 | Baier et al. | |
| 7,215,643 B2 | 5/2007 | Mussman et al. | |
| 7,339,934 B2 | 3/2008 | Mussman et al. | |
| 7,346,043 B1 | 3/2008 | Olshansky | |
| 7,363,381 B2 | 4/2008 | Mussman et al. | |
| 7,379,471 B2 | 5/2008 | Mitsumori et al. | |
| 7,388,946 B1 | 6/2008 | Mussman et al. | |
| 2002/0103720 A1 | 8/2002 | Cline et al. | |

(Continued)

FOREIGN PATENT DOCUMENTS

WO   WO2007/047639   4/2007

(Continued)

OTHER PUBLICATIONS

International Search Report for corresponding application PCT/US2006/40504 mailed Sep. 20, 2007.

(Continued)

*Primary Examiner* — Brian Roberts
(74) *Attorney, Agent, or Firm* — Fish & Richardson P.C.

(57) ABSTRACT

A method performed by a device adapted for communication over a network includes establishing a presence on the network, obtaining default configuration information for the device via the network, the default configuration information identifying a service on the network, receiving a request for validation information from the service, providing the validation information to the service, the service generating device-specific information in response to the validation information, and obtaining the device-specific information.

32 Claims, 9 Drawing Sheets

U.S. PATENT DOCUMENTS

| | | | |
|---|---|---|---|
| 2002/0131402 A1 | 9/2002 | Lee et al. | |
| 2002/0141390 A1* | 10/2002 | Fangman et al. | 370/352 |
| 2002/0159440 A1 | 10/2002 | Mussman et al. | |
| 2002/0174117 A1 | 11/2002 | Nykanen | |
| 2002/0196776 A1* | 12/2002 | Chiang | 370/352 |
| 2003/0093563 A1* | 5/2003 | Young et al. | 709/245 |
| 2003/0156579 A1* | 8/2003 | Cho | 370/352 |
| 2003/0206546 A1* | 11/2003 | Beyda | 370/352 |
| 2004/0125923 A1 | 7/2004 | See et al. | |
| 2004/0139209 A1 | 7/2004 | Mussman et al. | |
| 2004/0213260 A1 | 10/2004 | Leung et al. | |
| 2005/0025043 A1 | 2/2005 | Mussman et al. | |
| 2005/0025123 A1 | 2/2005 | Mitsumori | |
| 2005/0180403 A1 | 8/2005 | Haddad et al. | |
| 2005/0180555 A1 | 8/2005 | Sarp et al. | |
| 2005/0189401 A1 | 9/2005 | Butzer et al. | |
| 2005/0198188 A1 | 9/2005 | Hickman | |
| 2005/0220139 A1 | 10/2005 | Aholainen | |
| 2006/0274733 A1 | 12/2006 | Mussman et al. | |
| 2007/0008893 A1* | 1/2007 | Singh et al. | 370/241 |
| 2007/0070976 A1 | 3/2007 | Mussman et al. | |
| 2007/0143449 A1 | 6/2007 | West | |
| 2007/0165607 A1 | 7/2007 | Mussman et al. | |
| 2007/0283042 A1 | 12/2007 | West | |
| 2007/0286361 A1 | 12/2007 | West | |
| 2008/0063149 A1 | 3/2008 | West | |
| 2008/0070528 A1 | 3/2008 | Joyner et al. | |
| 2008/0112327 A1 | 5/2008 | Mussman et al. | |

FOREIGN PATENT DOCUMENTS

| | | |
|---|---|---|
| WO | WO2007/047643 | 4/2007 |

OTHER PUBLICATIONS

Written Opinion for corresponding application PCT/US2006/40504 mailed Sep. 20, 2007.

Int'l Preliminary Report on Patentability in Application No. PCT2006/40504, dated Apr. 16, 2008.

Int'l Search Report & Written Opinion in Application No. PCT/US2006/40493, dated Feb. 11, 2008.

International Preliminary Report on Patentability in Application No. PCT/US2006/040493, dated Apr. 2, 2009.

Action and Response History in U.S. Appl. No. 11/580,701, as retrieved on May 26, 2010.

Response filed in EP Application No. 06817039.8, dated Jun. 26, 2008.

Action and Response History in U.S. Appl. No. 11/580,701, as retrieved on Jan. 5, 2011.

Office Action in U.S. Appl. No. 11/580,701, dated Apr. 6, 2011.

* cited by examiner

CONFIGURING A NETWORK DEVICE

CROSS-REFERENCE TO RELATED APPLICATION

This patent application claims priority to U.S. Provisional Application No. 60/727,130, which was filed on Oct. 14, 2005. The contents of U.S. Provisional Application No. 60/727,130 are hereby incorporated by reference into this patent application as if set forth herein in full.

TECHNICAL FIELD

This patent application relates generally to configuring a device adapted for communication over a network using, e.g., voice over Internet protocol (VoIP).

BACKGROUND

VoIP is a protocol that enables users to make telephone calls over a computer network, such as the Internet. VoIP is used to convert a voice signal from a telephone into a digital signal, which can be transmitted over the computer network. At a receiving end, VoIP is used to convert the digital signal back into a voice signal.

Currently, VoIP-enabled devices, such as telephones, require considerable configuration up front, which can make them difficult to use. For example, installation of a VoIP-enabled telephone on a network often requires a new user to enter a large number of configuration parameters in order to configure a new telephone on the network. These configuration parameters are typically entered via a Web browser interface, and must be entered for each new VoIP-enabled telephone that is added to the network. The amount of time and energy spent on this task can make VoIP phones unattractive, particularly for small businesses with limited resources.

Moreover, the foregoing installation method is error prone. For example, when system settings that affect telephones are made, an administrator must manually update every telephone that is affected by the change. Failure to make such changes can result in communication errors over the network.

SUMMARY

This patent application describes methods and apparatus, including computer program products (e.g., articles of manufacture), for configuring a device adapted (i.e., configured) for communication over a network using, e.g., voice over Internet protocol (VoIP).

In general, this application describes a method performed by a device, such as a telephone, adapted for communication over a network. The method comprises obtaining default configuration information for the device via the network, where the default configuration information identifies a service on the network, receiving a request for identification information from the service, providing the identification information to the service, where the service provides device-specific information following receipt of the identification information, and obtaining the device-specific information. The method may also include one or more of the following features.

The request for identification information may comprise a prompt that is generated in response to a communication from the service. The prompt may comprise at least one of an audio prompt, a video prompt, a text prompt, and an electronic query. The identification information may be provided via at least one of a keypad input, a keyboard input, a key input, and an electronic response.

The method may include configuring the device using the device-specific information, where the device-specific information configures the device so that the device is distinguishable from other like devices on the network. The method may also include establishing a presence on the network by sending a communication to a first network node, and receiving, from the first network node, a network address and an identity of a second network node from which to obtain the device-specific information.

Obtaining the default configuration information for the device may comprise checking the second network node for the device-specific information. If the second network node does not contain the device-specific information, the default configuration information may be obtained from the second network node.

The method may include connecting to the service on the network. Connecting may be effected by sending data to the service, where the service generates the device-specific information using the data and stores the configuration information in the second network node, receiving an instruction to re-boot from the service, and re-booting in response to the instruction. The data sent to the service may comprise an address corresponding to the device. Following re-booting, the method may include sending a communication to the first network node, receiving, from the first network node, the identity of the second network node from which to obtain the device-specific information, where the device-specific information is obtained from the second network node, and configuring the device using the device-specific information.

In general this application also describes a method of configuring a device adapted for communication over a network. The method comprises storing configuration information for the device, where the configuration information comprises first data that corresponds to the device, receiving a communication from the device, obtaining second data that corresponds to the device using the communication, retrieving the configuration information using the first data and the second data, generating a configuration file for the device using the configuration information, and storing the configuration file on the network so that the configuration file is accessible to the device. The method may include one or more of the following features.

The method may comprise receiving the configuration information from an administrative computer, where the configuration information corresponds, at least in part, to a type of the device. The second data may comprise an Internet protocol (IP) address, a media access control address (MAC), a serial number, or any other unique identifier. The device may be instructed to re-boot after generating the configuration file. A response may be requested from the device. The response may comprise the communication and the communication may comprise an address of the device. The address may comprise an Internet protocol (IP) address. Obtaining the second data may comprise using reverse address resolution protocol to obtain a media access control (MAC) address of the device using an IP address of the device.

An article of manufacture may store instructions that are executable to perform all or part of each of the foregoing methods and features. The article of manufacture may include one or more machine-readable media that store instructions that are executable by one or more processing devices to implement the methods and/or features.

In general, this application also describes a system comprising a telephone adapted for use with voice over Internet protocol (VoIP), and a central server configured to execute a service that is adapted to control configuring the telephone over a network. The telephone is adapted to establish a presence on the network, obtain default configuration information via the network, where the default configuration information is for identifying the service, receive a request for validation information from the service, provide the validation information to the service, where the service generates device-specific information in response to the validation information, and obtain the device-specific information. The system may also include one or more of the following features.

A first server may be adapted to identify services on the network. A second server may be adapted to provide the device-specific information to the telephone. The telephone may be adapted to obtain an address of the second server from the first server, and request the device-specific information from the second server using the address. If the second server does not contain the device-specific information, the telephone may be adapted to obtain the default configuration information from the second server, and use the default configuration information to obtain the device-specific information. An administrative computer may be adapted to provide at least some of the device-specific information to the central server. The validation information may include identification information.

The details of one or more examples are set forth in the accompanying drawings and the description below. Further features, aspects, and advantages will become apparent from the description, the drawings, and the claims.

DESCRIPTION OF THE DRAWINGS

FIG. 2, comprised of FIGS. 2a and 2b, is a process for configuring a device on the network of FIG. 1.

Like reference numerals in different figures indicate like elements.

DETAILED DESCRIPTION

Figure 1:
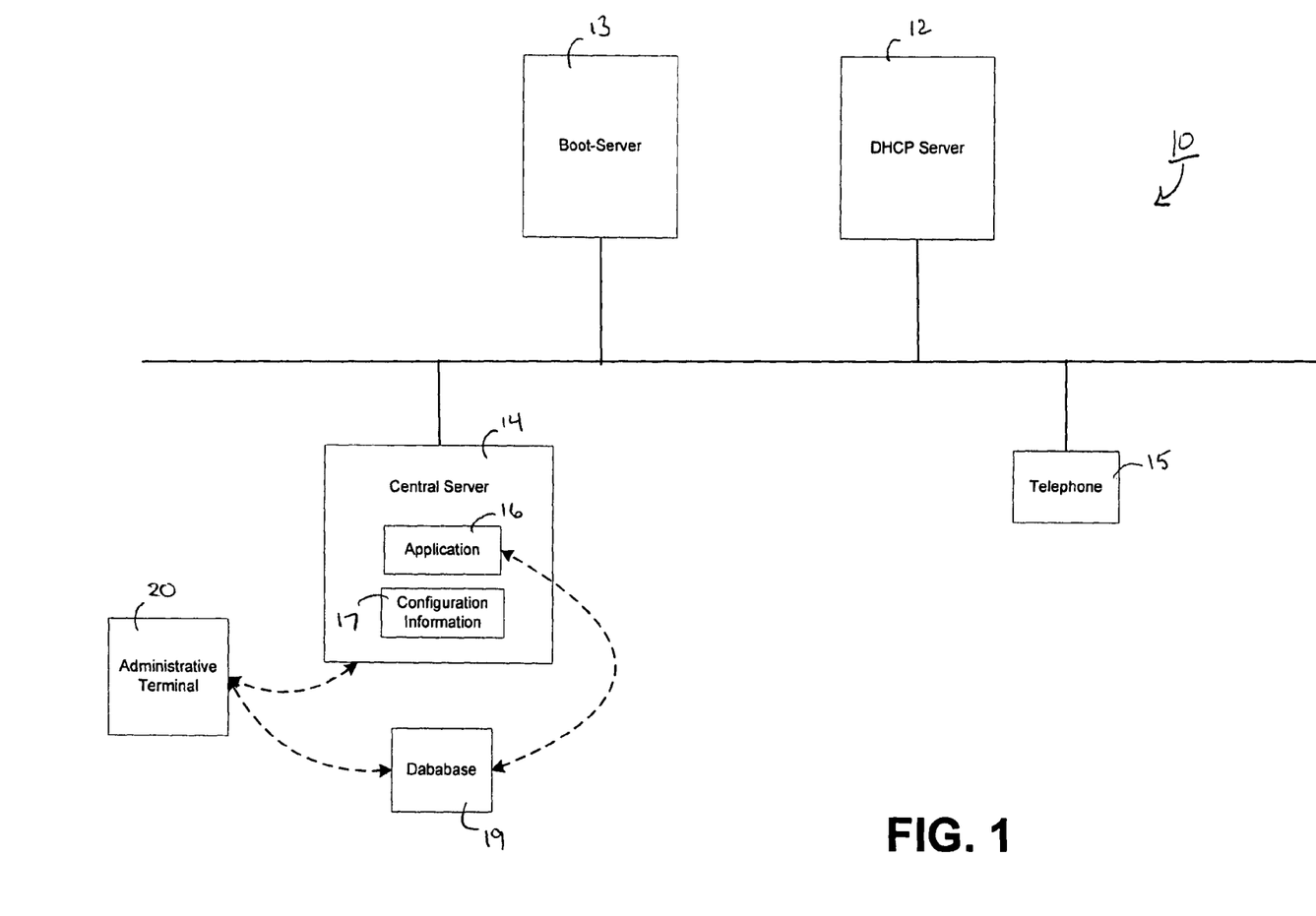
FIG. 1 is a block diagram of a network on which processes for configuring network devices may be implemented.

FIG. 1 shows a network 10, over which VoIP-enabled devices communicate. Network 10 may be an IP-enabled network, and may include a local area network (LAN), such as an intranet, and/or a wide area network (WAN), which may, or may not, include the Internet. Network 10 may be wired, wireless, or a combination of the two.

Network 10 includes servers 12 to 14, each of which implements a network node that may include a single computer or multiple computers (e.g., a server farm). In this implementation, each of the servers is assigned a different function, as described below. In other implementations, a single server can perform more than one such function or, alternatively, a single server may perform all of the functions.

Network 10 also includes one or more VoIP devices. At least one VoIP device may be a VoIP-enabled telephone 15. In this implementation, telephone 15 is manufactured by Polycom®; however, the processes described herein may be used with VoIP telephones or other devices from any manufacturer.

Described below is a process for configuring telephone 15. First, however, the elements of network 10, and their general functionality, are described.

Server 12 is adapted to run dynamic host control protocol (DHCP). In more detail, server 12 assigns a network address, in this example an IP address, to a device upon its entry into network 10. Server 12 thus implements dynamic addressing, whereby telephone 15 is assigned an IP address upon connection to network 10. The IP address may be the same, or different, each time telephone 15 connects to network 10. Telephone 15 establishes a presence on network 10 by virtue of its IP address.

Server 12, referred to herein as the DHCP server, is also adapted to provide information in addition to IP addresses. In particular, DHCP server 12 is configured to provide the address of server 13 on network 10 in response to a query (here, from telephone 15). In this implementation, the address of server 13 is referred to as "option 66" within server 12. Specifically, upon activation, also referred to as boot-up, telephone 15 sends a query to DHCP server 12. In response, DHCP server 12 sends telephone 15 the network address of server 13. In other implementations, DHCP server 12 may identify sever 13 by other methods and, as noted below, server 12 may not run DHCP.

Server 13, referred to herein as the boot-server, runs file transfer protocol (FTP). Briefly, FTP is a protocol for transferring files over an IP network, which operates in a manner similar to hypertext transfer protocol (HTTP) for transferring Web pages and simple mail transfer protocol (SMTP) for transferring electronic mail. Other implementations may use other protocols, such as trivial FTP (TFTP) and HTTP/S.

Here, telephone 15 opens an FTP session with boot-server 13 using the address obtained from DHCP server 12. During the FTP session, telephone 15 requests a configuration file from boot-server 13. As explained below, the configuration file is requested on the basis of the media access control (MAC) address of telephone 15 and, hence, is called "mac.cfg". In other implementations, the configuration file may be requested on the basis of another telephone identifier or parameter.

In any case, if boot-server 13 has the requested configuration file, it provides the configuration file to telephone 15 over network 10. Otherwise, boot-server provides a default configuration file. The default configuration file is used in generating a mac.cfg file for telephone 15, as described below.

A central server 14 controls configuration of telephone 15. In this regard, central server 14 implements a telephone activation service for use in configuring VoIP telephones (or other devices) on network 10. The telephone activation service may be implemented via an application 16 that is run on central server 14. Application 16 is configured to identify the MAC address of telephone 15 based on communications from telephone 15. For example, application 16 may use reverse address resolution protocol (RARP) to identify the MAC address of telephone 15 using an IP address of the telephone. The IP address of telephone 15 may be included in one or more data packets that are part of the communications from telephone 15 to central server 14.

Application 16 uses the MAC address of telephone 15 and configuration information 17 to generate a mac.cfg file for telephone 15. Application 16 may obtain the configuration information from central server 14, from an associated database 19, and/or from existing operating system, e.g., Windows®, files associated with a user of telephone 15. The configuration information may contain any type of information, such as the telephone number and/or internal extension of telephone 15, the identity of a user of telephone 15, ringtones or other information relating to telephone rings, network data, global configuration data, and the like. Basically, the configuration information can include any information relating to operation of telephone 15 and its operation on network 10.

Database 19 may be populated with configuration information, e.g., via an administrative terminal 20. Administrative terminal 20 may be one or more computer terminals through which a network administrator may enter some, or all, of the configuration information (e.g., configuration parameters) for telephone 15. The configuration parameters may be entered via a Web interface, for example, or through any other computer data entry system. Configuration information that is used for all VoIP telephones on network 10 may be input once and stored for later use.

Figure 2A:
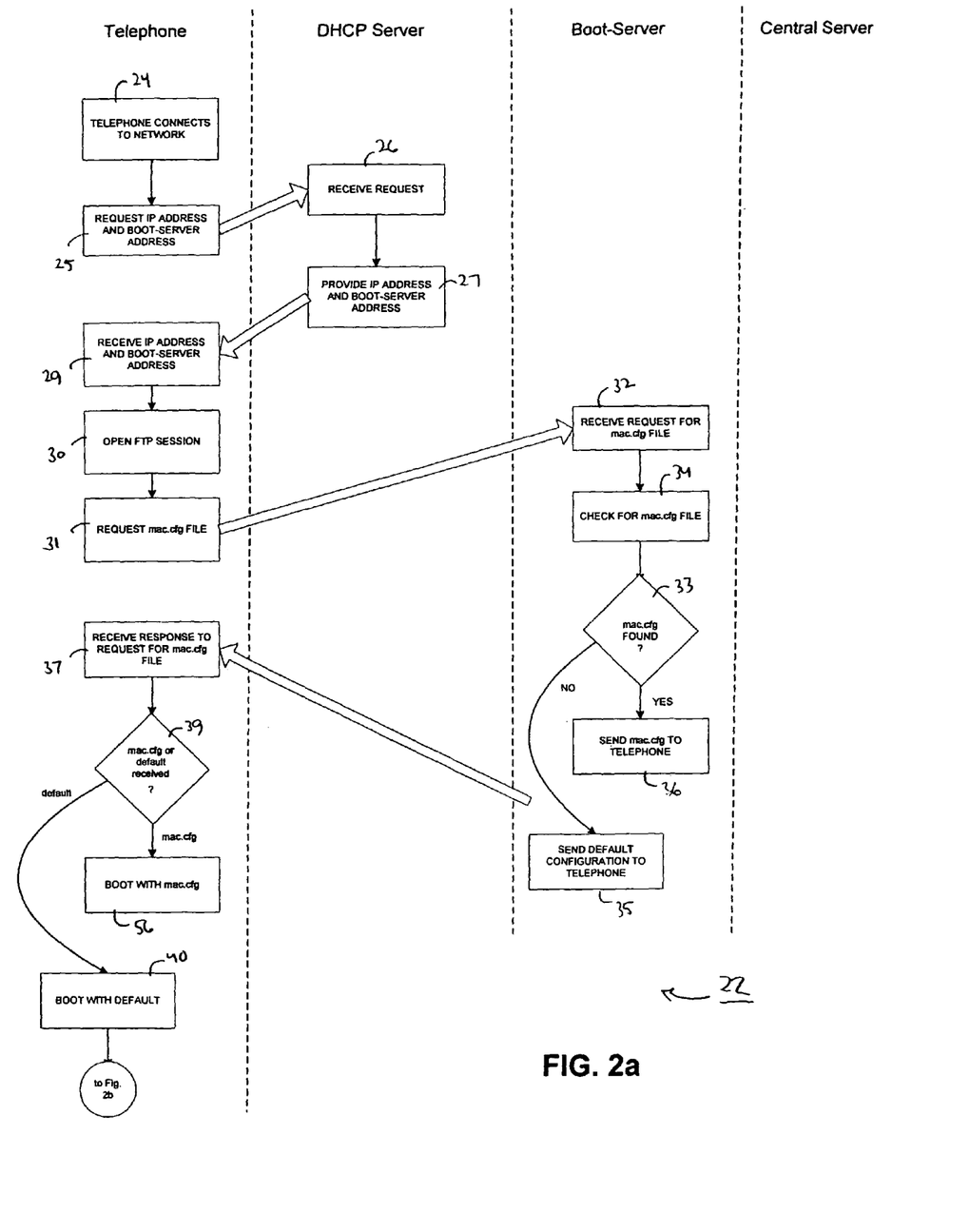
Figure 2B:
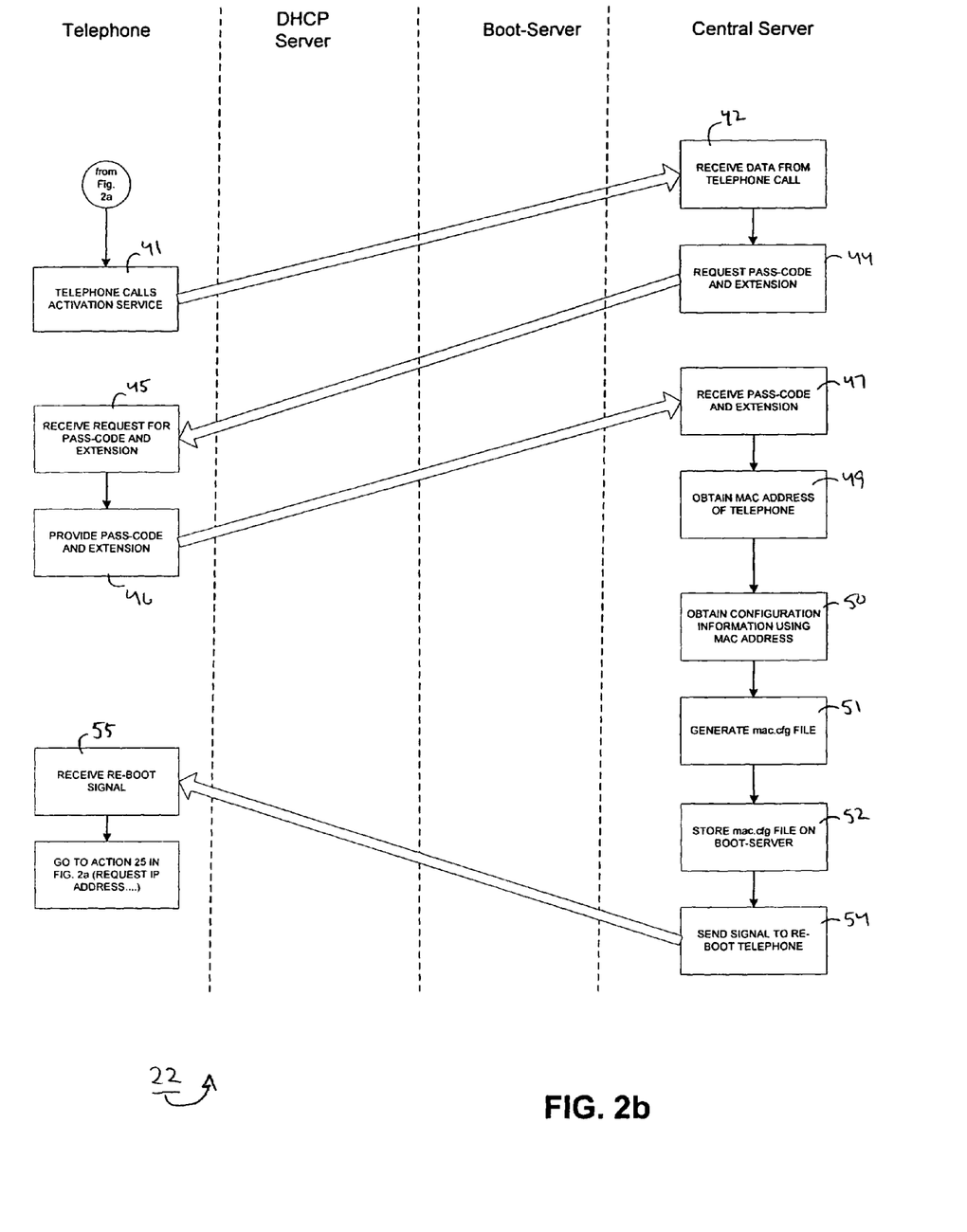

FIG. 2 shows a process 22 for configuring telephone 15 using application 16. In this implementation, as depicted in FIG. 2, the actions listed under "telephone" are performed by telephone 15; the actions listed under "DHCP server" are performed by DHCP server 12; the actions listed under "boot-server" are performed by boot-server 13; and the actions listed under "central server" are performed by central server 14.

In process 22, telephone 15 connects (24) to network 10. That is, telephone 15 may be connected physically, e.g., via Ethernet, to network 10. Following connection, telephone 15 sends data to DHCP server 12. This data constitutes a request (25) for an IP address. DHCP server 12 receives (26) the request from telephone 15 and assigns telephone 15 an IP address. DHCP server 12 sends (27) the IP address to telephone 15, along with a network address (in this example, an IP address) of boot-server 13. That is, DHCP server 12 executes "option 66" either in response to the initial request for an IP address or in response to a subsequent request of telephone 15.

Telephone 15 receives (29) its IP address (thereby establishing its presence on network 10) and the network address of boot-server 13. Telephone 15 opens (30) an FTP session with boot-server 13, and request (31) its mac.cfg file from boot-server 13. Boot server receives (32) the request from telephone 15 and checks (34) its (internal or external) memory for the mac.cfg file for telephone 15. Boot-server 13 may check for the mac.cfg file using the MAC or IP address of telephone 15, which may be obtained from communications with telephone 15. That is, the mac.cfg file may be stored in association with, and therefore may be retrieved using, the telephone's MAC or IP address.

If boot-server 13 does not contain, or otherwise have access to, the mac.cfg file for telephone 15, boot-server 13 sends (35) telephone 15 a default configuration file (in this example, called a 000000000000.cfg file). The default configuration file contains instructions that enable telephone 15 to contact the telephone activation service, which may be running, e.g., on central server 14. The following text describes the case in which boot-server 13 sends the default configuration file. The case in which boot-server 13 sends (36) the mac.cfg file for telephone 15 is described below.

Telephone 15 receives (37) a response to its request for a configuration file. If the response contains (39) the default configuration file (as is assumed in this example), telephone 15 boots (40) using the default configuration file. In this example, the default configuration file contains a telephone number of the activation service on central server 14 (here, extension "ACTIVATE", although any alphanumeric string may be used). In other implementations, the default configuration file may use ways of communicating to the activation service other than dialing the service. Telephone 15 goes off-hook and calls (41) the activation service (which, in this example, is run by application 16 on central server 14). Telephone 15 automatically dials the activation service when it goes off-hook; it is not capable of calling any other numbers in this implementation. Application 16 receives (42) the telephone call from telephone 15 and requests (44), from telephone 15, a pass-code and an extension. This request may be made via an interactive voice application or via any other means. Validation information other than a pass-code and extension may be requested and received.

Telephone 15 receives (45) the request and provides (46) the pass-code and extension to application 16. The pass-code and extension may be input to the telephone by its user. Application 16 receives (47) the pass-code and extension, and validates the pass-code. The extension also may require validation, e.g., to confirm that it is unique on network 10. In this implementation, only authorized telephones, as determined by their passcodes and/or extension, will operate on network 10.

Figure 7:
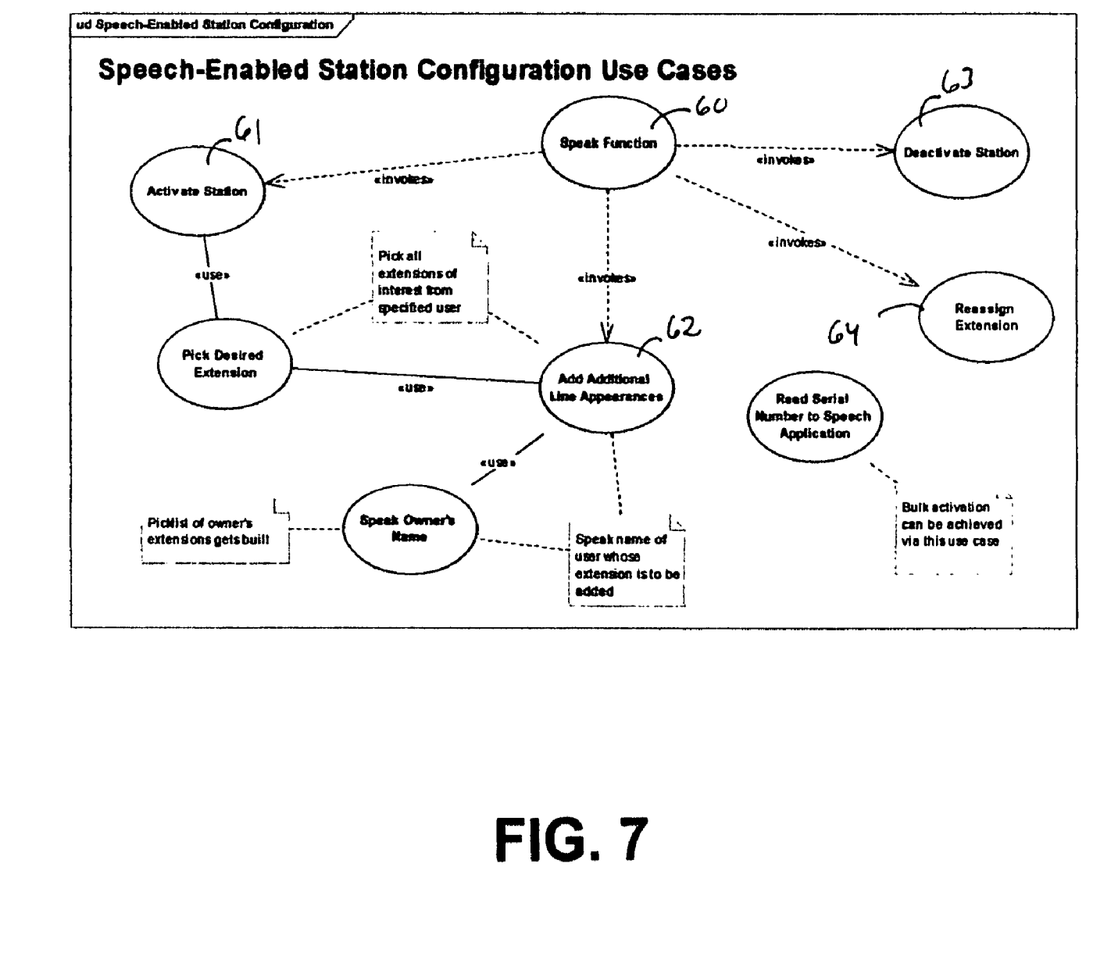
FIG. 7 is a diagram showing actions controlled by a speak function.

In other implementations, the request/response may include audio prompt(s) and a dial pad digit response, text prompt(s) and a digit response, screen display prompt(s) and a keyboard input, electronic query and responses of any sort, such as via a smart card, USB (Universal Serial Bus) dongle, RFID (Radio Frequency IDentifier), or any other means. Any combination of these, or other, actions may also be used. Automatic speech recognition (ASR), text-to-speech (TTS), and prerecorded prompts can be used together in an interactive application to enable simple configuration/activation/etc. over the network using an individual's voice instead of (or in addition to) DTMF (Dual Tone Multi-Frequency). For example, as shown in the diagram of FIG. 7, a speak function 60 may be used to activate (61) the station, to add additional lines (62) to the station, to deactivate (63) the station, and/or to reassign (64) an extension to the station.

Communications, such as data packets, sent from telephone 15 to application 16 contain the IP address of telephone 15. In this example, application 16 uses RARP to obtain (49) the MAC address of telephone 15 using its IP address. Other ways of obtaining the MAC address may also be used. Application 16 obtains (50) device-specific configuration information for telephone 15 using the MAC address. Application 16 may obtain the configuration information, e.g., from database 19, from configuration file(s) on central server 14, and/or from operating system, e.g., Windows®, files relating to a user of telephone 15 that are accessible to application 16 via network 10.

Application 16 obtains the configuration information for telephone 15, as noted above, and generates (51) a mac.cfg configuration file that is specific for telephone 15, i.e., a device-specific configuration file. The mac.cfg file contains configuration information, such as a telephone number, that distinguishes telephone 15 from other like VoIP-enabled devices on network 10. The mac.cfg file may also contain session initiation protocol (SIP) information that is global for network 10.

In this implementation, application 16 stores (52) the mac.cfg file on boot-server 13 in association with, e.g., the MAC (or IP) address of telephone 15. Application 16 also sends (54) telephone 15 a signal instructing telephone 15 to re-boot. Re-booting is performed using the newly-generated mac.cfg file. Telephone 15 receives (55) the re-boot signal from application 16. In response, telephone 15 re-boots.

At re-boot, telephone 15, requests (25), from DHCP server 12, an IP address and the address of boot-server 13. Thereafter, process 22 proceeds in the manner explained above until point 33. At that point, boot-server 13 sends (36) the mac.cfg file to telephone 15 instead of the default configuration file. Telephone 15 receives (37) the mac.cfg file and boots (56)

using the mac.cfg file. Telephone 15 uses configuration information in the mac.cfg file to configure itself for VoIP operations via network 10.

Process 22 is repeated each time telephone 15 re-boots. So, if telephone 15 is to be reconfigured, application 16 need simply update the mac.cfg file for telephone 15. Thereafter, when telephone 15 re-boots, any new information in the mac.cfg file is used to reconfigure telephone 15 for VoIP operation on network 10. The same is true for other telephones or VoIP-enabled devices on network 10. For example, if the same extension is to ring on two telephones, the mac.cfg files for each of those telephones may be updated, and the telephones may be re-booted to effect the new configuration.

In other implementations, telephone 15 may not require re-booting and/or searching for a mac.cfg file. That is, the mac.cfg file, or any other type of configuration information, may be downloaded to the telephone while it is operational. Without re-booting, the telephone may receive the configuration information and reconfigure itself during operation. Such implementations are advantageous because they eliminate the need to re-boot for reconfiguration.

In this regard, the fact that Polycom® telephones require re-booting is an implementation detail, i.e., it's a means to an end until dynamic run-time configuration updates are supported. Other types of telephones can be reconfigured and assume new configurations regardless of how such telephones are signaled for configuration changes.

In other implementations, telephone 15 may not require a separate mac.cfg file. Instead, upon entry into the network, telephone 15 may contact DHCP server 12, as above, and then automatically contact the activation service (i.e., there is no need for boot-server 13). In these implementations, telephone 15 may be configured using a standard Web-based interface (not shown). Application 16, however, may fill-in some or all of the fields of the Web-based interface automatically (i.e., without requiring user input or with reduced user input) using stored configuration information, and then activate the Web-based interface to reconfigure the telephone. Reconfiguration may, or may not, require re-booting.

In other implementations, telephone 15 may not support FTP or DHCP. In these implementations, telephone 15 may simply search network 10 for a configuration file and/or activation service, e.g., on central server 14. Application 16 may configure the telephone in any of the ways described herein. For example, application 16 may obtain the MAC address or IP address of telephone 15, obtain a configuration file or other configuration information for telephone 15 using its address, and control configuration of telephone 15 in any of the ways described above.

In other implementations, the central server may implement a front-end for the boot-server or the entire boot-server itself. The telephone contacts the central server to activate/register a new telephone by providing user-supplied credentials. The credentials may be used to point to a station-specific (e.g., by make and/or model) folder containing appropriate device-specific configuration files for the new telephone. This approach obviates the need for MAC address discovery because it is possible detect the file that is being requested (e.g., the mac.cfg file) and create the file in real-time if the file doesn't exist. The telephone subsequently downloads the configuration file.

In the implementations described above, telephone 15 is detected based on communications to/from central server 14. In other implementations, telephone 15 may be detected by listening on network 10 for communications to/from telephone 15. If need be, telephone may be detected by a network "sniffer" that looks specifically for central server/VoIP related requests. In other implementations, central server 14 may perform the functions of DHCP server 12, in which case central server 14, and thus application 16, will know the identity of telephone 15 based, e.g., on its IP and/or MAC addresses.

In this regard, it is noted the invention is not limited to use with IP and/or MAC addresses. Rather, any type of information may be used to identify telephone 15 to application 16. For example, a serial number of telephone 15 may be used. Likewise, a model type and/or other assigned identifier may be used. Information used from SIP messages and/or registrations may also be used to identify the telephone. In other implementations, telephone 15 may be identified using its session initiation protocol (SIP) REGISTER request or SIP INVITE request, by intercepting its domain name server (DNS) and/or DNS SRV requests, or using a barcode reader (e.g., serial numbers of telephones can be scanned and passed across the network as data).

Figure 3:
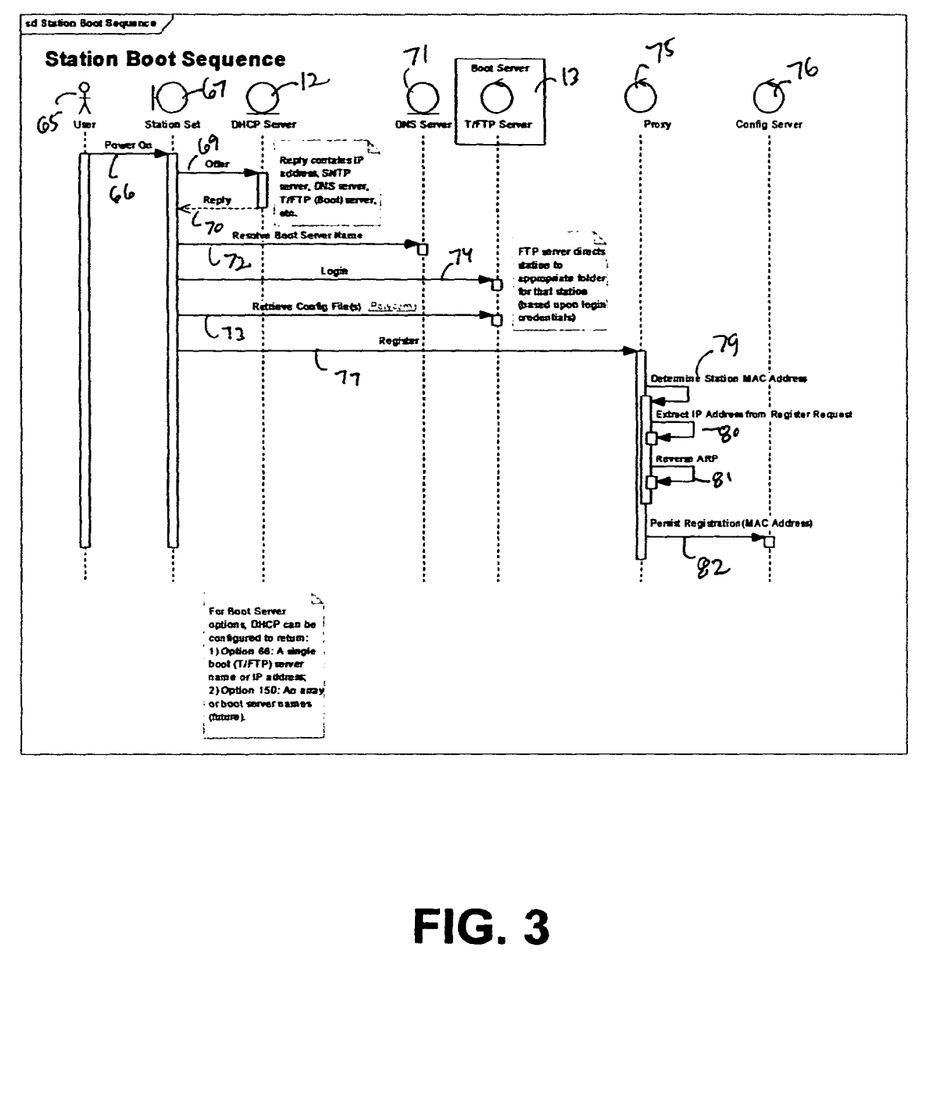
FIGS. 3 to 6 show unified modeling language (UML) diagrams depicting implementations of the process shown in FIG. 2.

FIGS. 3 to 6 show a specific implementation of process 22 using UML diagrams. Referring to FIG. 3, a user 65 powers-up (66) a network device (referred to in the UML diagrams as a "station"), such as a telephone. The station 67 sends (69) an offer to DHCP server 12, which replies (70) with information, including an IP address, and addresses of a DNS 71 and a boot-server 13 (T/FTP server). The station resolves (72) the name of the boot-server using the DNS and logs into (74) the boot-server. The station retrieves (73) device-specific (here, Polycom®-specific) configuration files from the boot-server, as described above (assuming, of course, that those files exist). The station registers (77) with the central server, here including a proxy 75 and a configuration server 76. The proxy determines (79) the MAC address of the station by extracting (80) its IP address and performing (81) RARP. The proxy registers (82) with the configuration server using the MAC address of the station.

Figure 4:
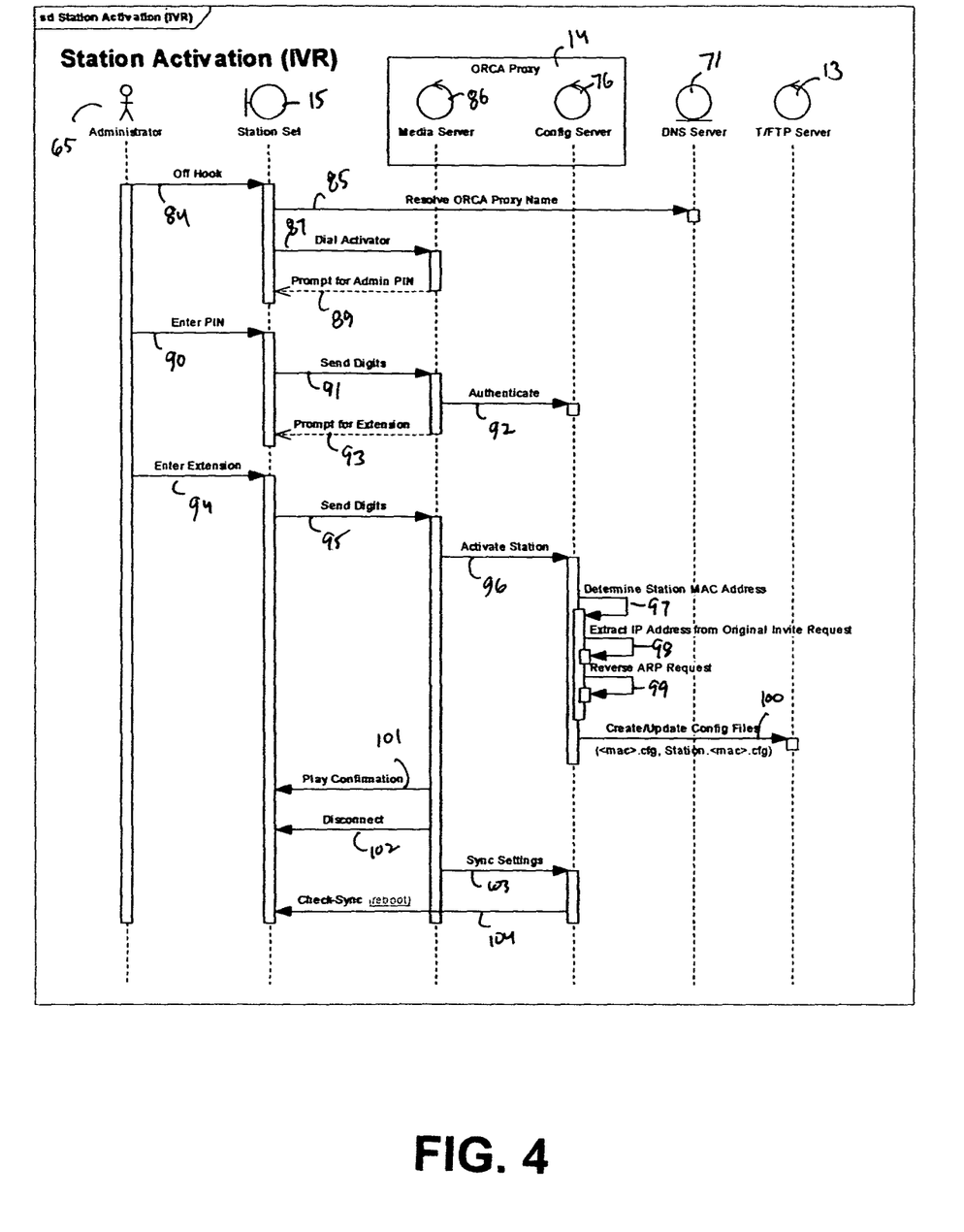

FIG. 4 shows activating a station that does not have a pre-existing configuration file. A user, such as an administrator 65, takes the station off-hook (84). The station resolves (85) the name of the proxy using DNS server 71. The station dials (87) the activation service (shown as part of a media server 86 in the central server 14). The activation service requests (89) an administrator personal identification number (PIN). The user enters (90) the PIN; the station sends (91) the PIN to the configuration server, which authenticates (92) the PIN; and the activation service prompts (93) the user for an extension. The user enters (94) the extension; the station sends (95) the extension to the activation service; and the activation service sends (96) an activation instruction to the configuration server. The configuration server determines (97) the MAC address of the station by extracting (98) its IP address and performing (99) RARP. The configuration server creates/updates (100) device-specific configuration file(s) for the station (e.g., the mac.cfg file described above), and sends the device-specific configuration file(s) to the boot-server. Thereafter, the activation service plays (102) a confirmation message to the station, disconnects (102) from the station, and sets (103) synchronization settings with the configuration server, which checks (104) for re-boot via those settings.

Figure 5:
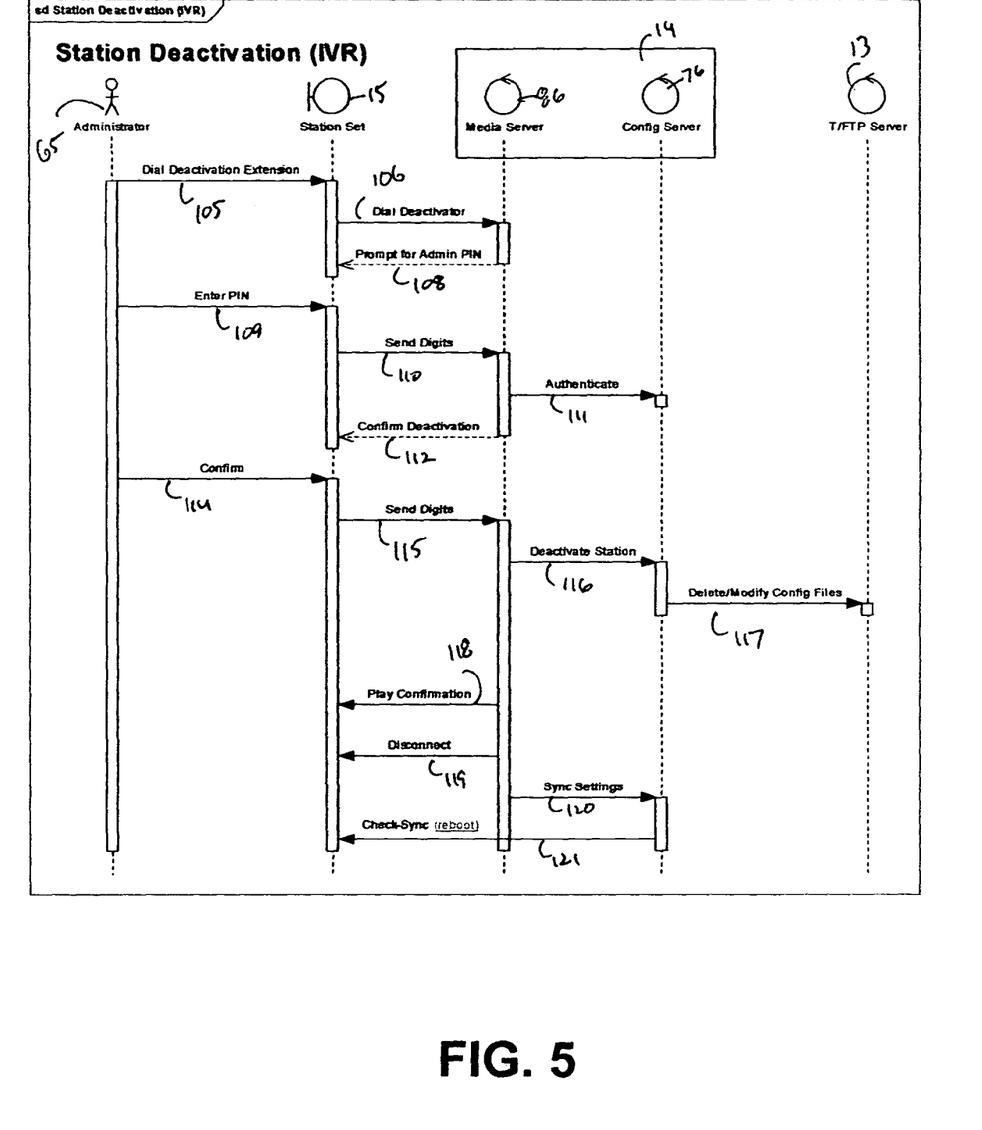

FIG. 5 shows deactivating a station that has a pre-existing configuration file. A user, such as an administrator 65, enters (105) an extension of a deactivation service, which may be part of the activation service (media server 86) in the central server. The station dials (106) the deactivation service. The deactivation service receives the call, and prompts (108) the user for a PIN. The user enters (109) the PIN; the station sends (110) the PIN to the deactivation service; and the deactivation service sends (111) the PIN to the configuration server for authentication. Upon authentication, the deactivation service requests (112) confirmation of deactivation from the station. The user enters (114) confirmation (e.g., an alphanumeric string); the station sends (115) the confirmation to the deactivation service; and the deactivation service instructs the configuration server to deactivate (I 16) the station. The configuration server does so by deleting (I 17) (or modifying) the device-specific configuration file(s) on the boot-server (e.g., the mac.cfg file). Thereafter, the deactivation service plays (118) a confirmation message to the station, disconnects (119) from the station, and sets (120) synchronization settings with the configuration server, which checks (121) for re-boot via those settings.

Figure 6:
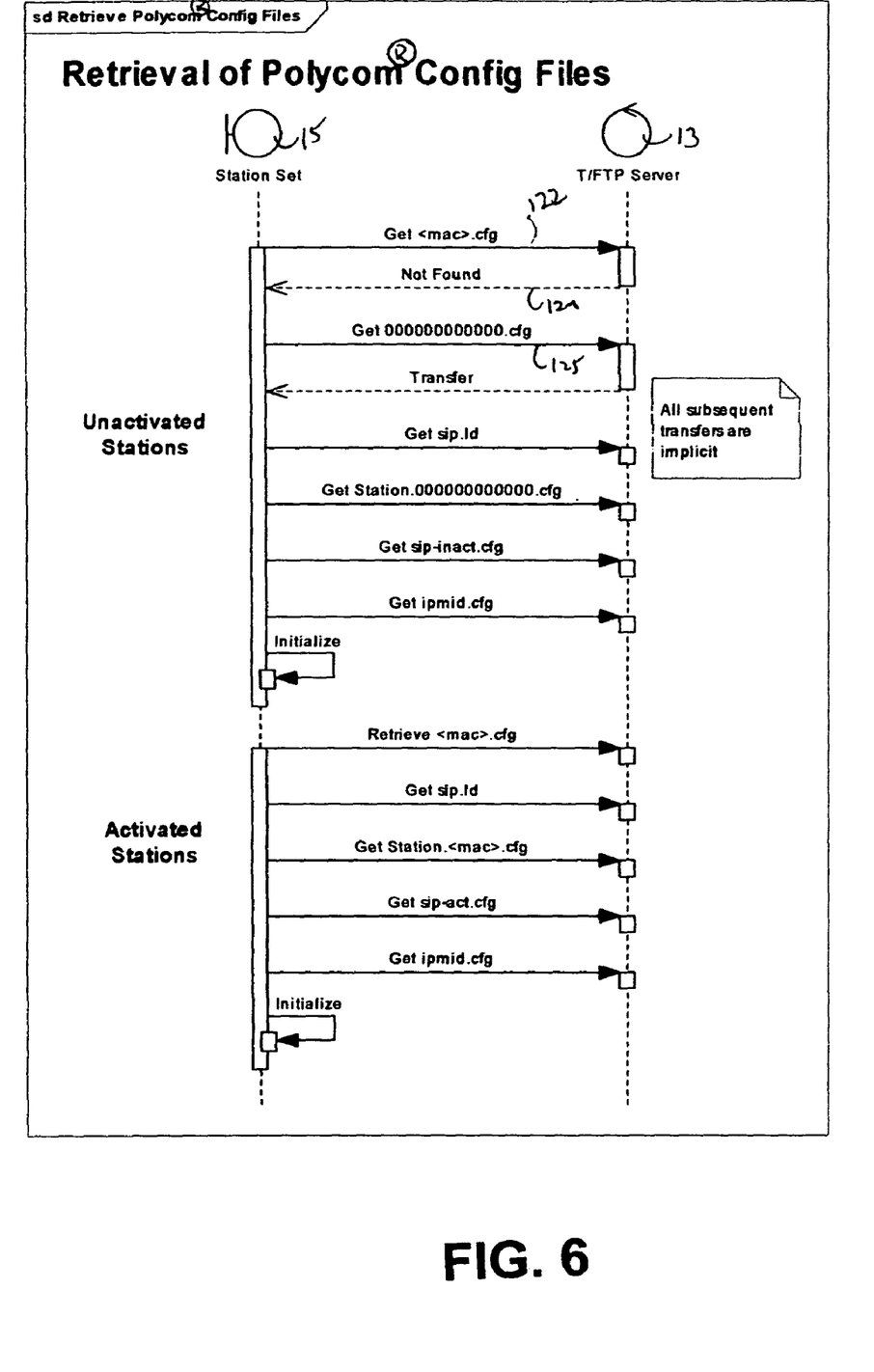

FIG. 6 shows how unactivated and activated stations obtain default and device-specific configuration information. Starting with the unactivated station, the unactivated station requests (122) a device-specific configuration file (e.g., mac.cfg file) from the boot-server 13. The boot-server replies (124) that such a file is not found. The station request (125) a default configuration file (e.g., 000000000000.cfg file) and obtains that file, along with other configuration files and a session initiation protocol (SIP) identifier (ID). Thereafter, the processes described herein are used to obtain the device-specific configuration file using the default configuration file. Activated stations simply request and receive the mac.cfg file, along with other configuration files.

Figure 8:
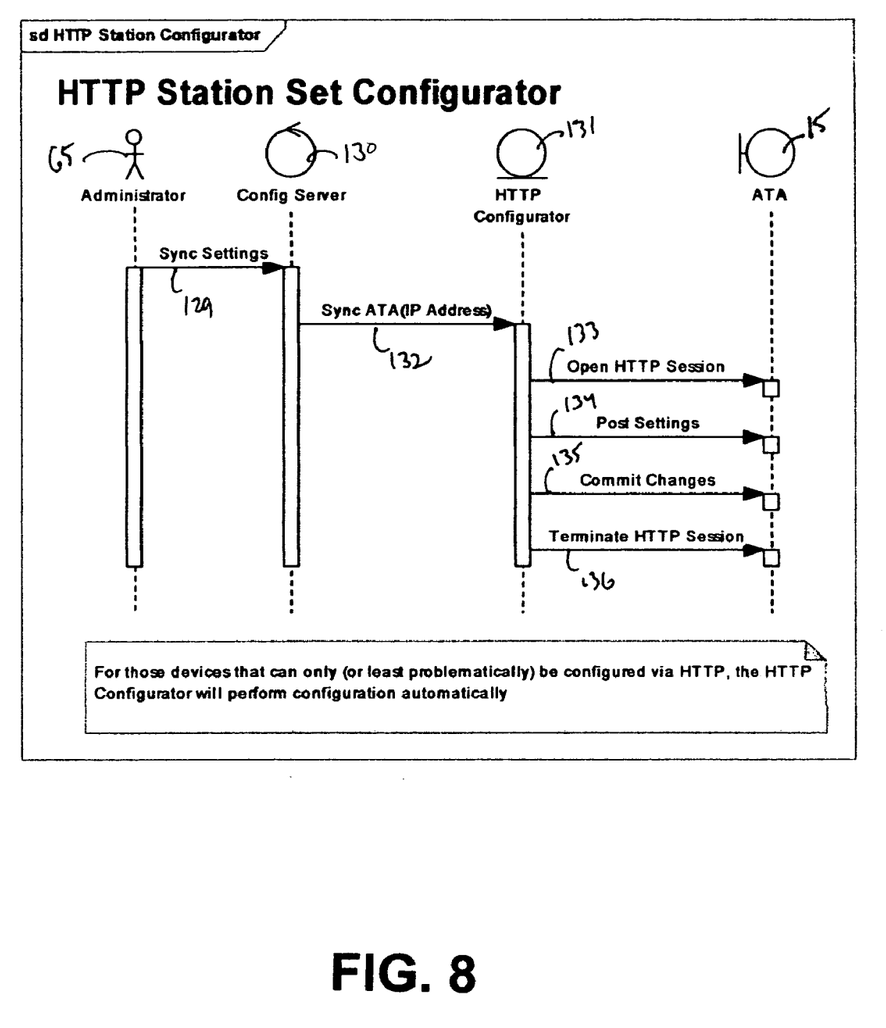
FIG. 8 is a UML diagram showing a device configuration process using HTTP.

In other implementations, a device, such as a telephone, may be configured using an HTTP station set configurator, which may or may not be implemented on the network of FIG. 1. FIG. 8 shows a UML diagram of such a system. According to FIG. 8, a user, such as administrator 65, sends (129) synchronization settings to a configuration server 130. The configuration server communicates (132) the synchronization settings to the HTTP configurator 131. The HTTP configurator opens (133) an HTTP session with the device 15, posts (134) the new settings, commits (135) the changes, and terminates (136) the HTTP session, thereby reconfiguring the device.

All or part of the processes described herein and their various modifications (hereinafter referred to as "the processes") can be implemented, at least in part, via a computer program product, i.e., a computer program tangibly embodied in one or more information carriers, e.g., in one or more machine-readable storage media or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The processes are not limited to use with VoIP-enabled telephones or to any particular hardware or hardware manufacturer. Rather, the processes can be implemented to configure any networked device, which may or may not run VoIP. Likewise, the processes are not limited to the specific hardware and protocols described herein.

Elements of different implementations described herein may be combined to form other implementations not specifically set forth above. Other implementations not specifically described herein are also within the scope of the following claims.

What is claimed is:

1. A method performed by a device adapted for communication over a network, the method comprising:
    establishing a presence on the network by:
        sending a communication to a first network node; and
        receiving, from the first network node, a network address and an identity of a second network node from which to obtain first device-specific information;
    obtaining default configuration information for the device via the network, the default configuration information for connecting to a service on the network;
        wherein obtaining the default configuration information comprises checking the second network node for the first device-specific information; and
        wherein, if the second network node does not contain the first device-specific information, the default configuration information is obtained from the second network node;
    connecting to the service using the default configuration information;
    receiving a request for identification information from the service;
    providing the identification information to the service, the service providing the first device-specific information following receipt of the identification information;
    configuring the device using the first device-specific information;
    requesting second device-specification information from the service while connected to the network;
    receiving the second device-specific information from the service if the service has the second device-specific information; and
    reconfiguring the device using the second device-specific information;
    wherein the first device-specific information and the second device-specific information are associated with a same user of the device.

2. The method of claim 1, wherein the request for identification information comprises a prompt that is generated in response to a communication from the service.

3. The method of claim 2, wherein the prompt comprises at least one of an audio prompt, a video prompt, a text prompt, and an electronic query; and
wherein the identification information is provided via at least one of a keypad input, a keyboard input, a key input, and an electronic response.

4. The method of claim 1, wherein the device is configured using the first or second device-specific information so that the device is distinguishable from other like devices on the network.

5. The method of claim 1, wherein connecting to the service is effected by sending data to the service, the service generating the first device-specific information using the data; and wherein configuring the device comprises:
receiving, from the service, an instruction to re-boot; and re-booting in response to the instruction.

6. The method of claim 5, wherein the first or second device-specific information is obtained from the second network node.

7. The method of claim 5, wherein the data comprises an address corresponding to the device.

8. The method of claim 1, wherein the device comprises a telephone.

9. A method of configuring a device adapted for communication over a network, the method comprising:
storing configuration information for the device, the configuration information comprising first data that corresponds to the device;
receiving a communication from the device;
obtaining second data that corresponds to the device using the communication;
retrieving the configuration information using the first data and the second data;
generating a first configuration file for the device using the configuration information;
storing the first configuration file on the network so that the first configuration file is retrievable by the device;
sending a signal to the device, responsive to which the first configuration file is retrievable;
receiving a subsequent communication from the device while the device is on the network; and
updating the first configuration file to produce a second configuration file for the device, the second configuration file being different from the first configuration file, the first and second configuration files being associated with a same user of the device.

10. The method of claim 9, further comprising:
receiving the configuration information from an administrative computer, the configuration information corresponding, at least in part, to a type of the device.

11. The method of claim 9, wherein the second data comprises an Internet protocol (IP) address, a media access control address (MAC), a serial number, or any other unique identifier.

12. The method of claim 9, wherein the signal comprises an instruction to re-boot the device.

13. The method of claim 9, further comprising:
requesting a response from the device, the response comprising the communication, the communication comprising an address of the device.

14. The method of claim 13, wherein the address comprises an Internet protocol (IP) address; and
wherein obtaining the second data comprises using reverse address resolution protocol to obtain a media access control (MAC) address of the device using an IP address of the device.

15. A system comprising:
a telephone adapted for use with voice over Internet protocol (VoIP); and
a central server configured to execute a service that is adapted to control configuring the telephone over a network;
wherein the telephone is adapted to:
(a) establish a presence on the network by:
sending a communication to a first network node; and
receiving, from the first network node, a network address and an identity of a second network node from which to obtain first device-specific information;
(b) obtain default configuration information via the network, the default configuration information for connecting to the service;
wherein obtaining the default configuration information comprises checking the second network node for the first device-specific information; and
wherein, if the second network node does not contain the first device-specific information, the default configuration information is obtained from the second network node;
(c) receive a request for validation information from the service;
(d) provide the validation information to the service, the service for generating the first device-specific information in response to the validation information;
(e) configure the telephone using the first device-specific information;
(f) request second device-specification information from the service while connected to the network;
(g) receive the second device-specific information from the service if the service has the second device-specific information; and
(h) reconfigure the telephone using the second device-specific information;
wherein the first device-specific information and the second device-specific information are associated with a same user of the telephone.

16. The system of claim 15, further comprising:
a first server adapted to identify services on the network; and
a second server adapted to provide the first device-specific information and the second device-specific information to the telephone;
wherein the telephone is adapted to obtain an address of the second server from the first server, and to request the first device-specific information or the second device-specific information from the second server using the address.

17. The system of claim 15, further comprising:
an administrative computer adapted to provide at least some of the first device-specific information or the second device-specific information to the central server.

18. The system of claim 15, wherein the validation information comprises identification information.

19. One or more non-transitory machine-readable media storing instructions that are executable to configure a communication device adapted for communication over a network, the instructions for causing one or more processing devices to:
store configuration information for the communication device, the configuration information comprising first data that corresponds to the communication device;
receive a communication from the communication device;

obtain second data that corresponds to the communication device using the communication;

retrieve the configuration information using the first data and the second data;

generate a first configuration file for the communication device using the configuration information;

store the first configuration file on the network so that the first configuration file is retrievable by the communication device;

send a signal to the communication device, responsive to which the first configuration file is retrievable;

receive a subsequent communication from the communication device; and update the first configuration file to produce a second configuration file for the communication device, the second configuration file being different from the first configuration file, the first and second configuration files being associated with a same user of the communication device.

20. The one or more non-transitory machine-readable media of claim 19, further comprising instructions for causing one or more processing devices to:

receive the configuration information from an administrative computer, the configuration information corresponding, at least in part, to a type of the communication device.

21. The one or more non-transitory machine-readable media of claim 19, wherein the second data comprises an Internet protocol (IP) address, a media access control address (MAC), a serial number, or any other unique identifier.

22. The one or more non-transitory machine-readable media of claim 19, wherein the signal comprises an instruction to re-boot the communication device.

23. The one or more non-transitory machine-readable media of claim 19, further comprising instructions for causing one or more processing devices to:

request a response from the communication device, the response comprising the communication, the communication comprising an address of the communication device.

24. The one or more non-transitory machine-readable media of claim 23, wherein the address comprises an Internet protocol (IP) address; and wherein obtaining the second data comprises using reverse address resolution protocol to obtain a media access control (MAC) address of the communication device using an IP address of the communication device.

25. One or more non-transitory machine-readable media storing instructions that are executable by a communication device adapted for communication over a network, the instructions for causing one or more processing devices to:

establish a presence on the network by:

sending a communication to a first network node; and receiving, from the first network node, a network address and an identity of a second network node from which to obtain first device-specific information;

obtain default configuration information for the communication device via the network, the default configuration information for connecting to a service on the network;

wherein obtaining the default configuration information comprises checking the second network node for the first device-specific information; and wherein, if the second network node does not contain the first device-specific information, the default configuration information is obtained from the second network node;

connect to the service using the default configuration information;

receive a request for identification information from the service;

provide the identification information to the service, the service providing the first device-specific information following receipt of the identification information;

configure the communication device using the first device-specific information;

request second device-specification information from the service while connected to the network;

receive the second device-specific information from the service if the service has the second device-specific information; and reconfigure the communication device using the second device-specific information;

wherein the first device-specific information and the second device-specific information are associated with a same user of the communication device.

26. The one or more non-transitory machine-readable media of claim 25, wherein the request for identification information comprises a prompt that is generated in response to a communication from the service.

27. The one or more non-transitory machine-readable media of claim 26, wherein the prompt comprises at least one of an audio prompt, a video prompt, a text prompt, and an electronic query; and wherein the identification information is provided via at least one of a keypad input, a keyboard input, a key input, and an electronic response.

28. The one or more non-transitory machine-readable media of claim 25, wherein the communication device is configured using the first or second device-specific information so that the communication device is distinguishable from other like communication devices on the network.

29. The one or non-transitory machine-readable media of claim 25, wherein connecting to the service is effected by sending data to the service, the service generating the first device-specific information using the data; and wherein configuring the communication device comprises:

receiving, from the service, an instruction to re-boot; and re-booting in response to the instruction.

30. The one or more non-transitory machine-readable media of claim 29, wherein the first or second device-specific information is obtained from the second network node.

31. The one or more non-transitory machine-readable media of claim 29, wherein the data comprises an address corresponding to the communication device.

32. The one or more non-transitory machine-readable media of claim 25, wherein the communication device comprises a telephone.

* * * * *